FUSE SWITCH

Original Filed Sept. 18, 1950 3 Sheets-Sheet 1

INVENTOR.
VERNON HELLSTERN
BY
Sutherland, Polster & Taylor
ATTORNEYS

FUSE SWITCH

Original Filed Sept. 18, 1950 3 Sheets-Sheet 2

INVENTOR.
VERNON HELLSTERN
BY
Sutherland, Polster & Taylor
ATTORNEYS

FUSE SWITCH

Original Filed Sept. 18, 1950 3 Sheets-Sheet 3

INVENTOR.
VERNON HELLSTERN
BY
Sutherland, Polster & Taylor
ATTORNEYS

United States Patent Office

Re. 25,003
Reissued July 4, 1961

25,003
FUSE SWITCH

Vernon Hellstern, Glendale, Mo., assignor, by mesne assignments, to James R. Kearney Corporation, St. Louis, Mo., a corporation of Delaware Original No. 2,636,954, dated Apr. 28, 1953, Ser. No. 185,375, Sept. 18, 1950. Application for reissue Apr. 22, 1959, Ser. No. 808,288
6 Claims. (Cl. 200—114)

Matter enclosed in heavy brackets [ ] appears in the original patent but forms no part of this reissue specification; matter printed in italics indicates the additions made by reissue.

This invention relates generally to fuse switches, and more specifically to an improved housed fuse switch which includes a switch housing having a door that supports a fuse cartridge adapted on rupture of the fuse link of the switch to drop bodily out of the operative fusing position and swing outwardly and downwardly with the door from the closed to the open position of the door, the predominant object of the invention being to provide an improved switch of this type which, because of its unique construction and the novel arrangement of its parts, is capable of performing its intended function in an improved and highly efficient manner.

Figure 1:
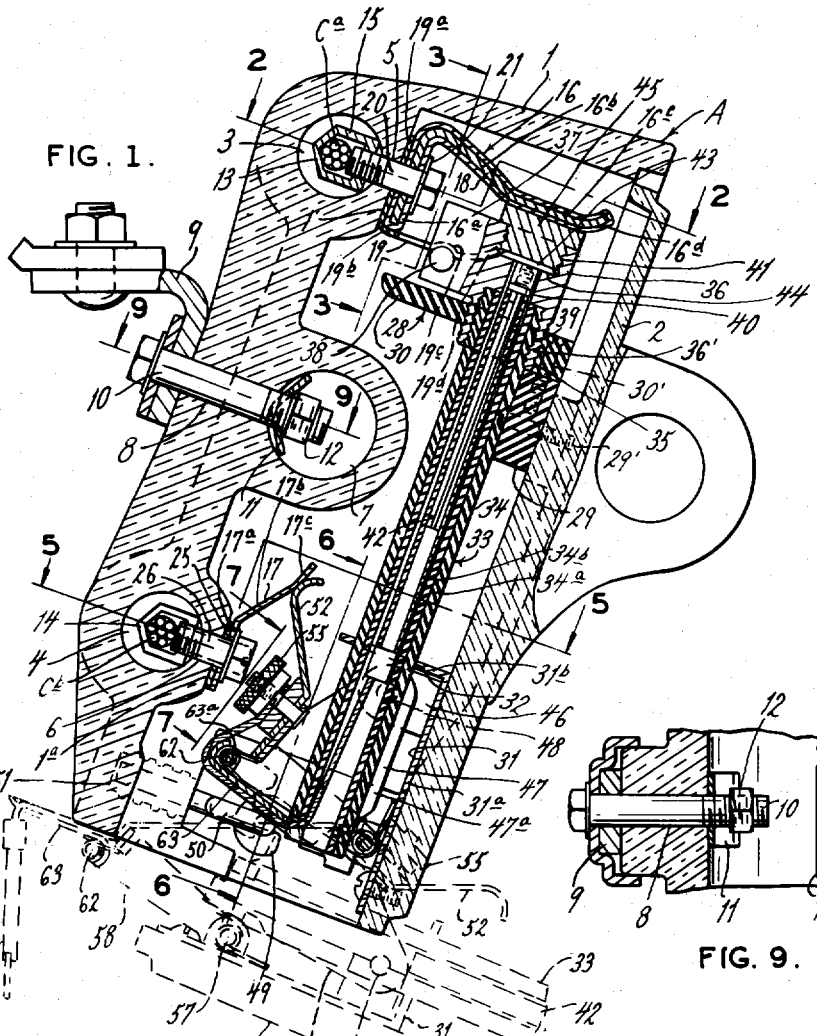
FIG. 1 is a vertical section taken through the improved fuse switch of this invention, and showing portions of the door and the fuse cartridge by broken lines in their dropped out positions.
Figure 9:
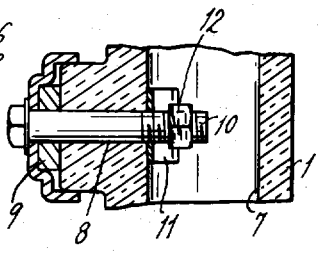
FIG. 9 is a horizontal section taken on line 9—9 of FIG. 1.

In the drawings, wherein is shown for purposes of illustrations, merely, one embodiment of the invention, A designates in FIG. 1 the improved fuse switch generally. The improved fuse switch A includes a housing 1 which is open at its front and bottom, said housing being provided at its front with a door 2 which is hinged with respect to the housing in a manner to be hereinafter set forth. The housing 1 is formed of porcelain, or other suitable electrical insulating material, and the rear wall of said housing in vertical section is shaped as is shown in FIG. 1. Formed transversely through the rear wall of the housing 1 adjacent to the top of the housing is an opening 3, and formed transversely through said rear wall adjacent to the bottom of the housing is a similar opening 4. The openings 3 and 4 are open at the outer side faces of the housing, and smaller openings 5 and 6 extend respectively from the openings 3 and 4 to the inner face of the rear wall of the housing. The rear wall of the housing 1 at the approximate vertical center of said housing is of considerably greater thickness than the remainder of said rear wall, and formed through this portion of the rear wall is an opening 7 which is open at the opposed outer side faces of the housing and is of greater diameter than the openings 3 and 4. In the case of the opening 7 an opening 8 of less diameter extends from said opening rearwardly to the rear face of the rear wall of the housing 1.

Arranged in contact with the rear face of the rear wall of the housing 1 is a hanger 9 which serves as means for attaching the fuse switch A to a support when the fuse switch is in use, and said hanger is secured to the housing 1 by a bolt 10 whose head engages a washer associated with the hanger assembly and which passes through the opening 8 and through an opening formed through the hanger which is alined with the opening 8. The inner portion of the bolt 10 extends into the opening 7, and a substantially V-shaped element 11 is located within this opening in contact with the wall thereof, said V-shaped element having an opening formed therethrough which the bolt extends, and a nut 12 which is mounted on the inner end portion of the bolt is screwed into close contact with said V-shaped element so as to securely fix the hanger to the housing.

Located within the openings 3 and 4 are terminals 13 and 14 to which are attached conductors Ca and Cb of the electrical circuit in which the fuse switch is interposed. Each of the terminal 13 and 14 comprises an elongated sleeve 15 which is shaped in cross-section as is shown in FIG. 1, each of said terminals being of slightly greater thickness at its base than elsewhere. Associated with the terminal 13 is an upper contact 16 and associated with the terminal 14 is a lower contact 17. The upper contact 16 comprises a base element 18 formed of suitable resilient material having a facing 18′ of copper, or other good electrical conductive material, said upper contact being shaped as is shown in FIG. 1. That is to say, the upper contact includes a portion 16a which extends parallel relative to a face 1′ of the rear wall of the housing 1, an intermediate forwardly and downwardly inclined portion 16b, and an outer, forwardly extended portion 16c whose forward end portion 16d is curved outwardly and upwardly (FIG. 1).

Figure 2:
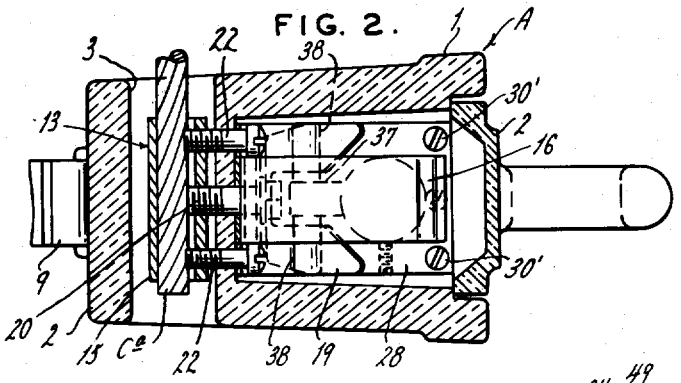
FIG. 2 is a horizontal section taken on line 2—2 of FIG. 1.
Figure 3:
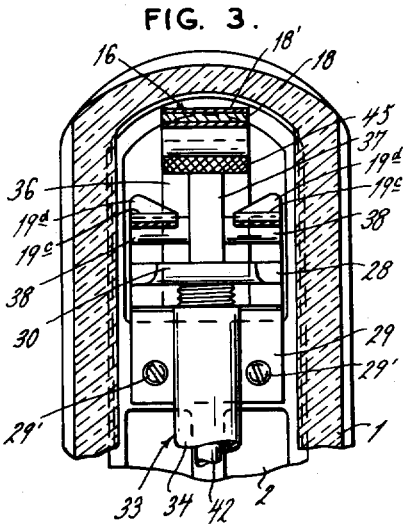
FIG. 3 is a fragmentary vertical section taken on line 3—3 of FIG. 1.

Interposed between the portion 16a of the upper contact and the face 1′ of the rear wall of the housing 1 is an upwardly extended portion 19a of a resilient latch member 19, said latch member having a forwardly extended leg portion 19b which is provided with a keeper portion 19c and whose outer end portion 19d is curved upwardly and outwardly. The upper contact 16 and the latch member 19 are secured in place within the upper portion of the housing 1 by means of a bolt 20 whose shank portion extends through alined openings formed through the portion 16a of the upper contact 16 and the portion 19a of the latch member 19, the screwthreaded end portion of said bolt 20 being screwed into a screwthreaded opening formed in the base portion of the terminal 13 (FIG. 1), and there being a washer 21 interposed between the head of the bolt 20 and a forward face portion of the portion 16a of the upper contact 16. In order to securely fix the terminal 13 to the conductor Ca a pair of clamping bolts 22 are provided. The shanks of these clamping bolts extend through openings formed through the rear wall of the housing 1 and screwthreadedly project through screwthreaded openings formed through the base portion of the terminal 13, the other ends of said bolts forcibly engaging the conductor Ca, as is shown to good advantage in FIG. 2, and the heads of said bolts 22 engaging washers 23 which contact with a plate 24 that contacts with the face 1′ of the housing 1.

Figure 5:
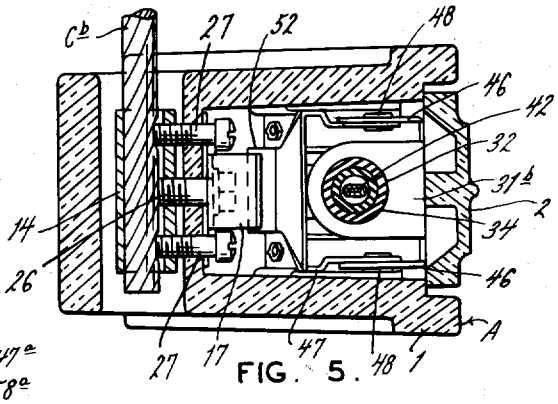
FIG. 5 is a horizontal section taken on line 5—5 of FIG. 1.

The lower contact 17 comprises a strip of resilient material which is a good conductor of electricity, said strip of material having a lower portion 17a, an upwardly and forwardly inclined, intermediate portion 17b, and an upper portion 17c. The lower portion 17a of the lower contact engages a plate 25 which contacts with a face 1a of the housing 1 and this plate and the portion 17a of the lower contact 17 have alined openings formed therethrough through which the shank of a bolt 26 extends, the screwthreaded end portion of the shank of said bolt 26 being screwed through a screwthreaded opening formed through the base portion of the terminal 14, and the head of said bolt 26 engaging a washer which contacts with the forward face of the portion 17a of the lower contact 17. Also, the terminal 14 has associated therewith a pair of clamping bolts 27 (FIG. 5) which are arranged as are the clamping bolts 22 associated with the terminal 13, as has been previously explained herein, said clamping bolts 27 serving to secure the conductor Cb to the terminal 14.

The door 2 of the fuse switch of the present invention has secured to the upper portion thereof a bracket structure 28 which is formed by a member 29 that is fixed to the inner face of the door by fastening devices 29', and a member 30 which is secured to the member 29 by means of fastening devices 30', the bracket structure and the door preferably being formed from electrical nonconductive material. Also, secured to the lower portion of the door 2 at the inner face thereof is a second bracket member 31 which is of inverted L-shaped formation, there being a bracket portion 31a which contacts with the inner face of the door 2, and an upper portion 31b that extends inwardly of the housing 1 from the upper end of the bracket portion 31a and which is provided with an opening 32 formed therethrough.

The brackets 28 and 31 support a fuse cartridge 33 which includes a tube structure 34 comprising an outer tube 34a formed of Bakelite, or other material possessing required characteristics, and an inner tube 34b formed of horn fiber, said tube structure being extended through the opening 32 of the portion 31b of the bracket 31. The member 30 of the bracket structure 28 is provided with a screwthreaded opening 35 into which is screwed the screwthreaded shank 36' of a head 36, said head being provided with a rearwardly projected extension 37 having latching pins 38 extended outwardly from opposite sides thereof. The head 36 is provided with a screwthreaded opening 39 formed therein which receives the externally screwthreaded upper portion of the outer tube 34a of the tube structure 34, as shown in FIG. 1, said screwthreaded opening 39 being located largely in the shank 36' of said head 36. The head has an opening 40 formed therein which is of approximately the same diameter as the bore of the inner tube 34b of the tube structure, as is shown in FIG. 1, and said opening 40 communicates with the bore of said inner tube 34b. Also, the opening 40 communicates at its upper end with a screwthreaded opening 41 formed in the head 36 which is of greater diameter than the opening 40.

The head 36 is formed of electrical conductive material and a fuse link 42 is extended through the opening 40 of said head and through the tube structure 34, said fuse link having a flanged cap 43 at its upper end the flange of which rests on a shoulder 44 within the head 36. The flange of the flanged cap 43 is forced into close contact with the shoulder 44 by a screwthreaded plug 45 which is screwed into the screwthreaded opening 41 of the head 36, said plug being formed of electrical conductive material, and the tail portion of the fuse link extends from the lower open end of the tube structure 34.

Referring now to the lower bracket 31 on the door 2 of the housing 1, it will be noted that the portion 31a of said bracket is provided with opposed ears 46 (FIGS. 1 and 6), and these ears hingedly support a hinge member 47. The hinge member comprises opposed side walls 47a which are joined by an integral bridge portion 47b, the upper portions of said opposed, side walls being secured by pivot elements 48 to the ears 46, and the lower portions of said opposed, side walls being provided with hook-shaped portions 49 which engage fixed hinge elements 50. The hinge elements 50 are in rod form and portions thereof are fixedly seated, with the aid of cement 51, in openings formed in wall portions of the housing 1. The bridge portion 47b of the hinge member 47 has fixed thereto a cartridge contact 52 which is shaped as is shown to good advantage in FIG. 1; that is to say, said cartridge contact is provided with a lower portion 52a which rests against and is secured to the bridge portion 47b of the hinge member 47, an intermediate inclined portion 52b which extends from the upper end of said portion 52a, and an upper, curved portion 52c. The cartridge contact 52 has associated therewith a block 53 which is shaped as is shown in FIG. 1, there being a headed screw-threaded element 54 which is extended through alined openings formed through the bridge portion 47b of the hinge member 47 and through the block 53, and said element 54 has a fuse link binding nut 55 mounted on its screwthreaded end portion.

Figure 4:
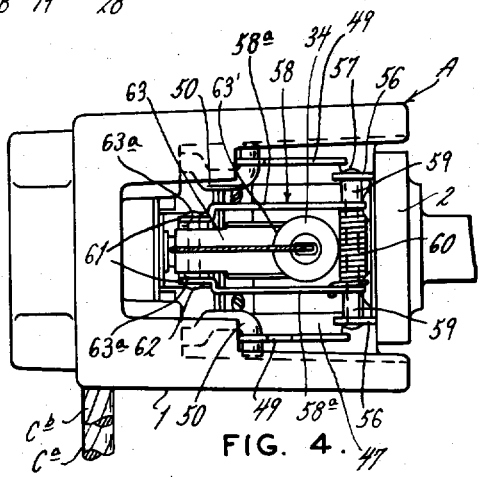
FIG. 4 is an inverted plan view of the fuse switch illustrated in FIG. 1.
Figure 6:
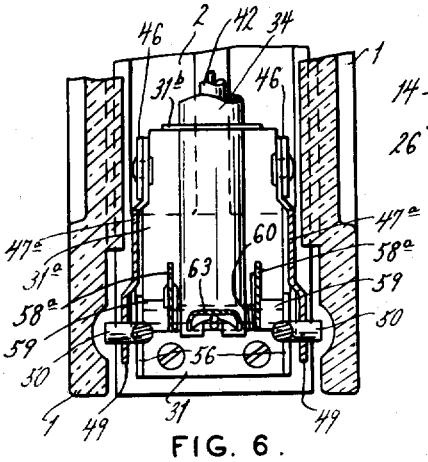
FIG. 6 is a fragmentary vertical section taken on line 6—6 of FIG. 1.

At its lower end portion the bracket 31 is provided with a pair of opposed ears 56 which support a pivot rod 57 (FIG. 4), and this pivot rod 57 in turn supports for pivotal movement a latch element 58. The latch element 58 is of substantially U-shaped configuration, having opposed side portions 58a and a bridge portion 58b, and the opposed side portions have fixed thereto outwardly extended bearing elements 59 through which the pivot rod 57 extends. Also, a torsional coil spring 60 embraces a portion of the pivot rod 57 which is located between the side portions 58a of the latch element, one end portion of said torsional coil spring contacting with the bracket 31 while the opposite end portion of said torsional coil spring contacts with a part of the latch element 58. Because of the arrangement of the torsional coil spring 60 as described above, said torsional coil spring tends to move the rear end of the latching element downwardly. The bridge portion 58b of the latch element 58 has formed thereon a pair of spaced ears 61 which support a pivot rod 62. The pivot rod in turn supports *ears 63a of* an arm 63 for pivotal movement with respect thereto, there being a torsional coil spring 64 arranged in embracing relation with respect to said pivot rod 62 with one end portion of said coil spring contacting with the bridge portion 58c of the latch element 58, with the other end portion of said coil spring contacting with the arm 63. The arm 63 at its free end is provided with an arcuate edge 63' (FIG. 4) and at that end thereof said arm is channel-shaped, as is shown in FIG. 6, and said arm 63 includes a curved portion 66 which partially embraces the torsional coil spring 64.

Figures 7, 8:
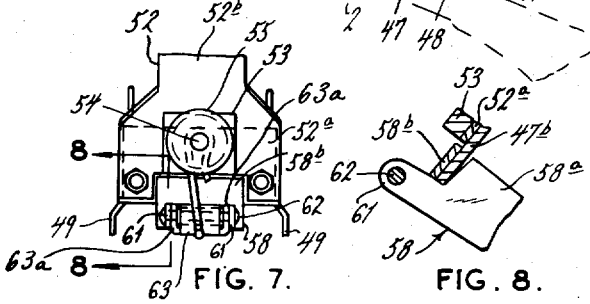
FIG. 7 is a fragmentary elevational view viewed from line 7—7 of FIG. 1.
FIG. 8 is a fragmentary section taken on line 8—8 of FIG. 7.
Figure 10:
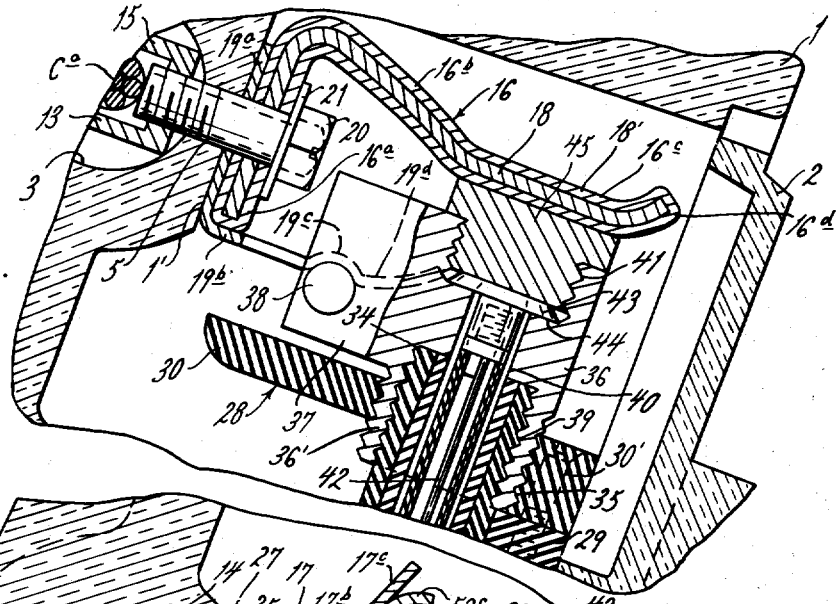
FIG. 10 is a fragmentary section of a portion of the switch.
Figure 11:
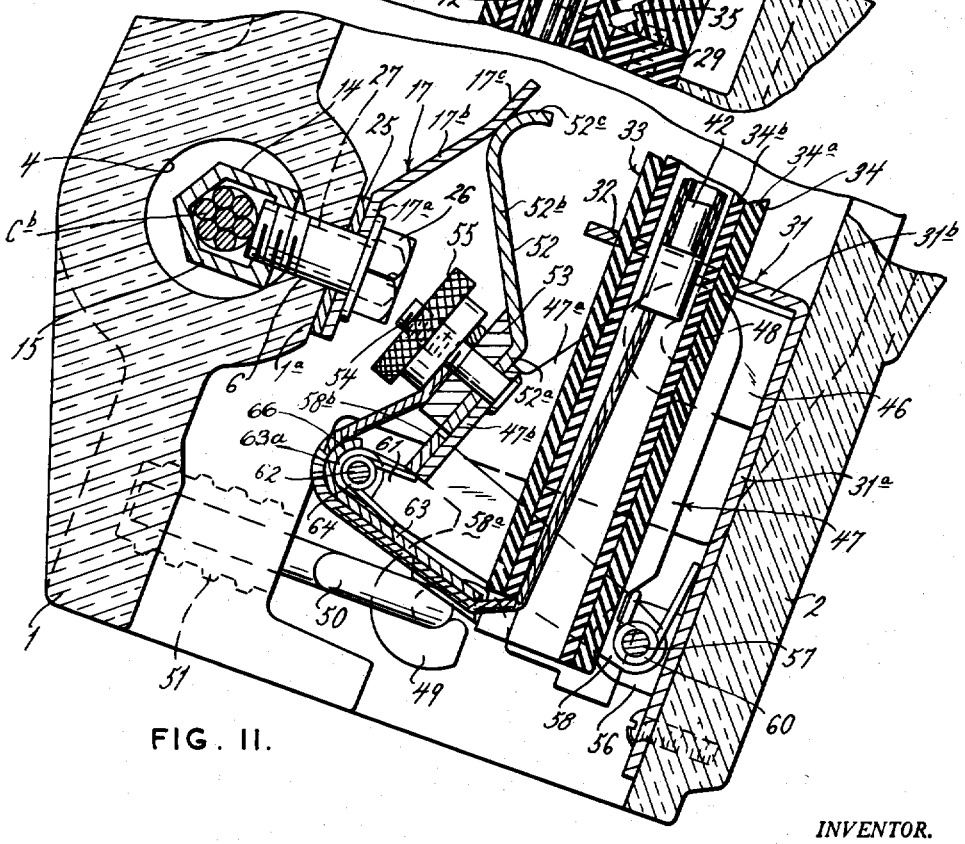
FIG. 11 is a similar view of another portion of the switch.

In the normal use of the improved fuse switch of this invention, the door and fuse cartridge assembly is in its closed position with respect to the housing 1, in which position the latch pins 38 are seated in the keeper portion 19c of the latching member 19, whereby the upper portion of the door is retained in its closed position. Also, in such closed position of the door and the fuse cartridge assembly the upper contact 16 contacts mechanically and electrically with the plug 45 at the top of the fuse cartridge. The intact fuse link extends downwardly through tube structure of the fuse link and extends from the open lower end of said tube structure, the rear end portion of the latch element 58 being disposed in its elevated position where the bridge portion 58b of said latch member engages behind the bridge portion 47b of the hinge member 47, as is shown in FIGS. 1 and 8. Additionally, the arm 63 is extended forwardly from the pivot rod 62 and the tail portion of the fuse link which extends out of the lower open end of the tube structure of the fuse cartridge extends longitudinally of the arm 63 so as to hold said arm 63 in its forwardly extended position against the force exerted by the torsional coil spring 64 which tends to move the forward end portion of said arm 63 downwardly, and so as to retain the latching element in its elevated position where it latches behind the bridge portion 47b of the hinge member 47, the end portion of the tail of the fuse link being clamped by the link binding element 55. With the parts of the fuse switch in the positions described the cartridge contact 52 is in electrical contact with the lower contact 17 of the housing and the electrical path through the switch is from the conductor Ca to the upper contact 16 by way of the upper terminal 13 and the bolt 20, from the upper contact by way of the plug 45, the fuse link 42, the block 53 and the cartridge contact 52 to the lower contact 17 of the housing 1, and from said lower contact 17 to the conductor Cb by way of the bolt 26 and the lower terminal 14.

Let it be assumed now that a fault occurs in the circuit in which the fuse switch is interposed which is of sufficient magnitude to rupture the fuse link 42. In this event rupture of the fuse link will release the arm 63 from the restraint normally imposed thereon by the intact fuse link and the torsional coil spring 64 swings the forward end portion of said arm downwardly about the pivot rod 62 whereby the lower portion of the ruptured fuse link will be pulled quickly from the tube structure of the fuse cartridge so as to extinguish any electrical arc which may be formed between the ruptured ends of the fuse link. Also, rupture of the fuse link permits the torsional coil spring 60 to swing the rear end portion of the latching element 58 downwardly about the pivot rod 57, thereby unlatching the bridge portion [58c] 58*b* of said latching element from the bridge portion 47b of the hinge member 47 and permitting said hinge member to rotate about the hinge elements 50. Such rotation of the hinge member 47 about the hinge elements 50 results in forward and downward movement of the pivot elements 48 with a consequent lowering of the door and fuse cartridge carried thereby which causes the latching pins 38 to move downwardly out of the keeper portions 19c of the latch member 19 and thus permit the door and fuse cartridge to fall outwardly and downwardly to the open switch position of said assembly, as is shown by broken lines in FIG. 1.

When the improved fuse switch has operated to the open switch position thereof, as is described above, and it is desired to replace the switch in operation in the circuit, the assembly comprised of the door and the fuse cartridge is detached from the housing by lifting the hook-shaped portion of the hinge member 47 off of the hinge elements of the housing. The plug 45 is then unscrewed and the upper portion of the ruptured fuse link is removed from the fuse cartridge, the lower portion of the ruptured fuse link also being detached from beneath the link binding element 55. A new fuse link is introduced through the tube structure of the fuse cartridge and the plug 45 is replaced, after which the latch element 58 and the arm 63 are moved to their operative positions and the tail portion of the fuse link is secured by the link binding element 55 in position where it retains said latch element and arm in their effective operative positions. The hook-shaped portions of the hinge member 47 are reengaged with the hinge elements 50 of the housing and the door and fuse cartridge assembly is swung upwardly and inwardly relative to the housing and about the hinge elements 50 into the closed-switch position thereof, as shown in FIG. 1, when the fuse switch is again in service.

I claim:

[1. A fuse switch comprising a housing, a door for said housing movably supported thereby, a fuse cartridge fixedly supported by said door and provided with a fuse link extended therethrough, a hinge member hingedly supported by hinge elements associated with said housing and pivotally attached to said door, said hinge member comprising opposed side walls which are joined by a bridge portion, a latching element pivotally supported by said door for latching said hinge member against pivotal movement relative to said door, said latching element being retained in a position where it latches said hinge member by the intact fuse link, and latch means for latching the upper portion of said door in its closed position relative to said housing, said latching element being released by rupture of said fuse link for movement which unlatches said hinge member and permits hinging movement of said hinge member relative to said hinge elements and pivotal movement of said hinge member relative to said door which causes said door and the fuse cartridge carried thereby to move downwardly so as to release said latch means at the upper portion of the door and permit the door and fuse cartridge assembly to swing outwardly and downwardly relative to said housing.]

2. A fuse switch comprising a housing, a door for said housing movably supported thereby, a fuse cartridge fixedly supported by said door and provided with a fuse link extended therethrough, a hinge member hingedly supported by hinge elements fixedly associated with said housing and pivotally attached to said door, said hinge member comprising opposed side walls which are joined by a bridge portion, a latching element pivotally supported by said door for latching said hinge member against pivotal movement relative to said door, spring means associated with said latching element which tends to move said latching element in one direction, said latching element being retained in a position where it latches said hinge member by the intact fuse link, and latch means for latching the upper portion of said door in its closed position relative to said housing, said latching element being released by rupture of said fuse link for movement which unlatches said hinge member and permits hinging movement of said hinge member relative to said hinge elements and pivotal movement of said hinge member relative to said door which causes said door and the fuse cartridge carried thereby to move downwardly so as to release said latch means at the upper portion of the door and permit the door and fuse cartridge assembly to swing outwardly and downwardly relative to said housing.

3. A fuse switch comprising a housing, a door for said housing movably supported thereby, a fuse cartridge fixedly supported by said door and provided with a fuse link extended therethrough, a hinge member hingedly supported by hinge elements associated with said housing and pivotally attached to said door, said hinge member comprising opposed side walls which are joined by an integral bridge portion a latching element pivotally supported by said door for engaging the bridge portion of and latching said hinge member against pivotal movement relative to said door, torsional spring means associated with said latching element which tends to move said latching element in one direction, said latching element being retained in a position where it latches said hinge member by the intact fuse link, and latch means for latching the upper portion of said door in its closed position relative to said housing, said latching element being released by rupture of said fuse link for movement which unlatches said hinge member and permits hinging movement of said hinge member relative to said hinge elements and pivotal movement of said hinge member relative to said door which causes said door and the fuse cartridge carried thereby to move downwardly so as to release said latch means at the upper portion of the door and permit the door and fuse cartridge assembly to swing outwardly and downwardly relative to said housing.

4. A fuse switch comprising a housing, a door for said housing movably supported thereby, a fuse cartridge fixedly supported by said door and provided with a fuse link extended therethrough, a hinge member hingedly supported by hinge elements associated with said housing and pivotally attached to said door, a latching element for latching said hinge member against pivotal movement relative to said door, said latching element being shaped to embrace a portion of said fuse cartridge and being retained in a position where it latches said hinge member by the intact fuse link, latch means for latching the uppe portion of said door in its closed position relative to said housing, said latching element being released by rupture of said fuse link for movement which unlatches said hinge member and permits hinging movement of said hinge member relative to said hinge elements and pivotal movement of said hinge member relative to said door which causes said door and the fuse cartridge carried thereby to move downwardly so as to release said latch means at the upper portion of the door and permit the door and fuse cartridge assembly to swing outwardly and downwardly relative to said housing, and an arm mounted pivotally on said latching element for such movement that it extracts a portion of the fuse link from the fuse cartridge on rupture of said fuse link.

5. A fuse switch comprising a housing, a door for said housing movably supported thereby, a fuse cartridge fixedly supported by said door and provided with a fuse link extended therethrough, a hinge member hingedly supported by hinge elements associated with said housing and pivotally attached to said door, a latching element for latching said hinge member against pivotal movement relative to said door, said latching element being shaped to embrace a portion of said fuse cartridge and being retained in a position where it latches said hinge member by the intact fuse link, latch means for latching the upper portion of said door in its closed position relative to said housing, said latching element being released by rupture of said fuse link for movement which unlatches said hinge member and permits hinging movement of said hinge member relative to said hinge elements and pivotal movement of said hinge member relative to said door which causes said door and the fuse cartridge carried thereby to move downwardly so as to release said latch means at the upper portion of the door and permit the door and fuse cartridge assembly to swing outwardly and downwardly relative to said housing, an arm mounted pivotally on said latching element for such movement that it extracts a portion of the fuse link from the fuse cartridge on rupture of said fuse link, and spring means for subjecting said arm to swinging movement.

6. A fuse switch comprising a housing, a door for said housing movably supported thereby, a fuse cartridge supported by said door and provided with a fuse link extended therethrough, a hinge member hingedly supported by hinge elements associated with said housing and pivotally attached to said door, a latching element for latching said hinge member against pivotal movement relative to said door, said latching element being shaped to embrace a porion of said fused cartridge and being retained in a position where it latches said hinge member by the intact fuse link, latch means for latching the upper portion of said door in its closed position relative to said housing, said latching element being released by rupture of said fuse link for movement which unlatches said hinge member and permits hinging movement of said hinge member relative to said hinge elements and pivotal movement of said hinge member relative to said door which causes said door and the fuse cartridge carried thereby to move downwardly so as to release said latch means at the upper portion of the door and permit the door and fuse cartridge assembly to swing outwardly and downwardly relative to said housing, an arm mounted pivotally on said latching element for such movement that it extracts a portion of the fuse link from the fuse cartridge on rupture of said fuse link, and torsional spring means for subjecting said arm to swinging movement.

7. A fuse switch comprising a housing, a door for said housing movably supported thereby, a fuse cartridge fixedly supported by said door and provided with a fuse link extended therethrough, a hinge member hingedly supported by hinge elements associated with said housing and pivotally attached to said door, a latching element for latching to said hinge member against pivotal movement relative to said door, said latching element being shaped to embrace a portion of said fuse cartridge and being retained in a position where it latches said hinge member by the intact fuse link, latch means for latching the upper portion of said door in its closed position relative to said housing, said latching element being released by rupture of said fuse link for movement which unlatches said hinge member and permits hinging movement of said hinge member relative to said hinge elements and pivotal movement of said hinge member relative to said door which causes said door and the fuse cartridge carried thereby to move downwardly so as to release said latch means at the upper portion of the door and permit the door and fuse cartridge assembly to swing outwardly and downwardly relative to said housing, an arm engaged by said fuse link and mounted pivotally on said latching element for such movement that it extracts a portion of the fuse link from the fuse cartridge on rupture of said fuse link, and spring means for subjecting said arm to swinging movement.

References Cited in the file of this patent or the original patent

UNITED STATES PATENTS

| | | |
|---|---|---|
| 2,073,186 | Steinmayer et al. | Mar. 9, 1937 |
| 2,249,178 | Schultz | July 15, 1941 |
| 2,359,153 | Rawlins | Sept. 26, 1944 |